(12) United States Patent
Ramesh et al.

(10) Patent No.: US 6,657,002 B2
(45) Date of Patent: Dec. 2, 2003

(54) POLYMERIC PIGMENT DISPERSANT UTILIZED AS A GRIND RESIN FOR PIGMENTS AND METHOD OF PREPARING THE SAME

(75) Inventors: Swaminathan Ramesh, Canton, MI (US); JoAnn Lanza, Southfield, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/747,474

(22) Filed: Dec. 22, 2000

(65) Prior Publication Data

US 2002/0123558 A1 Sep. 5, 2002

(51) Int. Cl.$^7$ ................................................. C08K 3/00
(52) U.S. Cl. ........................ 524/602; 524/601; 524/612; 528/272; 528/288; 528/297; 528/308
(58) Field of Search ................................ 524/601, 602, 524/612; 528/272, 288, 297, 308

(56) References Cited

U.S. PATENT DOCUMENTS

| 4,224,080 A | 9/1980 | Chambers et al. ........... 106/308 |
| 5,378,762 A | 1/1995 | Czornij et al. ............... 525/187 |
| 5,389,139 A | 2/1995 | Carpenter et al. ........... 106/404 |
| 5,603,865 A | 2/1997 | DePue et al. ............. 252/313.1 |
| 5,629,374 A | 5/1997 | Budde et al. ................ 524/549 |
| 5,684,078 A | 11/1997 | Pfaffenschlager et al. .. 524/457 |
| 5,786,420 A | 7/1998 | Grandhee ....................... 525/7 |
| 6,326,420 B1 * | 12/2001 | Olson et al. ................. 523/334 |

FOREIGN PATENT DOCUMENTS

| EP | 803 556 | 12/1995 | ......... C09D/133/14 |
| GB | 1108261 | 7/1964 | |

* cited by examiner

Primary Examiner—Edward J. Cain

(57) ABSTRACT

The present invention is directed to a polyester carboxylate polymeric pigment dispersant to be used as a grind resin to incorporate inorganic pigment into a pigment dispersion for a coating composition. The polymeric pigment dispersant is the reaction product of pentaerythritol, hexahydrophthalic anhydride, glycidylneodecanoate, and dimethylethanolamine. The present invention is also directed to a method of preparing the polymeric pigment dispersant. In this method, the pentaerythritol and the hexahydrophthalic anhydride are polymerized to form an intermediate compound. Next, an epoxy group of the glycidylneodecanoate reacts with the intermediate compound, and then the dimethylethanolamine neutralizes the intermediate compound to form the completed polymeric pigment dispersant. The polymeric pigment dispersant is utilized for efficient wetting and grinding of the pigment.

36 Claims, No Drawings

US 6,657,002 B2

POLYMERIC PIGMENT DISPERSANT UTILIZED AS A GRIND RESIN FOR PIGMENTS AND METHOD OF PREPARING THE SAME

FIELD OF THE INVENTION

The subject invention generally relates to a pigment dispersion utilized in aqueous coating compositions. More specifically, the subject invention relates to a polymeric pigment dispersant for an inorganic pigment and a method of preparing the polymeric pigment dispersant.

BACKGROUND OF THE INVENTION

Aqueous coating compositions typically include a primary binder resin, a crosslinker, a pigment or pigments to improve the aesthetics of the coating composition, and other coating additives such as solvents, flow and appearance control agents, fillers such as extender pigment, and the like.

It is understood in the art that the pigment is incorporated into the aqueous coating compositions via a pigment dispersion. The pigment dispersion is derived from dispersion of the pigment into a grind resin. More specifically, a mill, such as a ball mill, grind mill, or continuous mill, is utilized to incorporate the pigment into the grind resin. The mill integrates the pigment into the grind resin until a desired particle size of the pigment is achieved, and until the pigment is appropriately wetted by the grind resin and uniformly dispersed throughout the grind resin.

The grind resins of the prior art including, but not limited to, polyacrylate-based emulsions, have proven to be inadequate for use as a grind resin for dispersing pigment usable in aqueous coating compositions. The grind resins of the prior art are ineffective because these resins are unable to withstand mechanical forces exerted by the mill when integrating the pigment. These grind resins are also deficient in wetting the pigment and in maintaining the pigment dispersed throughout the grind resin. Instead, with the grind resins of the prior art, such as the polyacrylate-based emulsion grind resin, the pigment tends to coagulate or settle resulting in poor stability and inadequate 'shelf life' of the pigment dispersion.

These prior art grind resins also tend to have increased viscosities and, as understood in the art, increased viscosities typically inhibit the amount of pigment that can be incorporated into the grind resin. As a result, pigment dispersions that utilize the grind resins of the prior art cannot attain sufficient pigment-to-binder ratios while maintaining acceptable gloss and appearance in a film of the coating compositions. Also, due to the increased viscosity, these grind resins often require solvent and other additives which increases the overall volatile content of the pigment dispersion—a characteristic that is undesirable throughout the coating industry.

In sum, the prior art grind resins, as detailed above, are characterized by one or more inadequacies. Due to the inadequacies identified in the prior art, it is desirable to provide a polymeric pigment dispersant to be utilized as a grind resin for inorganic pigments and a method of preparing the polymeric pigment dispersant. It is advantageous that the polymeric pigment dispersant according to the subject invention effectively wets pigment, uniformly disperses pigment, and provides increased pigment-to-binder ratios accompanied with acceptable gloss and appearance in the film of the coating composition.

SUMMARY OF THE INVENTION

A polymeric pigment dispersant is disclosed. The polymeric pigment dispersant of the subject invention, a polyester carboxylate, is utilized as a grind resin to incorporate inorganic pigment into a pigment dispersion for aqueous coating compositions. This polymeric pigment dispersant is the reaction product of a first compound having a plurality of hydroxyl groups, a carboxylic acid anhydride, a second compound having at least one epoxy group, and an amine. The preferred polymeric pigment dispersant is the reaction product of pentaerythritol, hexahydrophthalic anhydride, glycidylneodecanoate, and dimethylethanolamine.

A method of preparing the polymeric pigment dispersant is also disclosed. According to this method, the first compound is reacted, or polymerized, with the carboxylic acid anhydride to form an intermediate compound having a plurality of carboxylic acid groups. Once the intermediate compound is formed, the epoxy group of the second compound is reacted with at least one of the carboxylic acid groups of the intermediate compound. The amine is then reacted with the remaining carboxylic acid groups of the intermediate compound in a neutralization step thereby forming the polymeric pigment dispersant of the subject invention.

In the method of preparing the preferred polymeric dispersant, one mole of pentaerythritol is reacted, i.e., polymerized, with four moles of hexahydrophthalic anhydride to form the intermediate compound. With these reactants, the intermediate compound includes four carboxylic acid groups. Next, one mole of glycidylneodecanoate is reacted with one of the four carboxylic acid groups of the intermediate compound, and then three moles of dimethylethanolamine are reacted with the remaining three carboxylic acid groups of the intermediate compound to form the preferred polymeric dispersant.

The general object of the subject invention is to develop a grind resin that effectively wets inorganic pigments used in aqueous coating compositions and that is capable of resisting mechanical forces introduced by the mills that are used to grind and integrate the inorganic pigments into the grind resin. In resisting the mechanical forces exerted by the mills, this grind resin is ideal in that it provides sufficient time for the mill to achieve the ideal particle size of the pigment.

It is a further object of the subject invention to develop a grind resin that has a relatively low molecular weight and a correspondingly low viscosity such that increased pigment-to-binder ratios can be achieved while maintaining a low viscosity for the pigment dispersion. More specifically, as a result of the relatively low viscosity of the grind resin of the subject invention, higher concentrations of pigments can be incorporated into the grind resin to attain the increased pigment-to-binder ratios of the pigment dispersion. Due to the higher concentration of pigment, a solid, into the grind resin, the volatile content of the pigment dispersion, and of the overall coating composition, is decreased. Also, even at the increased pigment-to-binder ratios, this grind resin demonstrates superior dispersion stability through extended shelf life of the pigment dispersion, and this grind resin is able to be completely dispersed into water with little or no co-solvent required to promote dispersibility. This grind resin is also suitable for achieving optimal appearance characteristics, such as distinctiveness and gloss, in a film of the coating composition.

DETAILED DESCRIPTION OF THE INVENTION

The polymeric pigment dispersant of the subject invention, a polyester carboxylate, is utilized as a grind resin to incorporate inorganic pigment into a pigment dispersion for aqueous coating compositions. Examples of inorganic pigments that are utilized in aqueous coating compositions include, among other inorganic pigments, titanium dioxide, $TiO_2$, and iron oxide, FeO, as well as certain aluminum and mica flake pigments. It is to be understood that the terms polymeric pigment dispersant and grind resin will be used interchangeably throughout the subject application. The polymeric pigment dispersant includes a highly-branched organic structure having various functionalities that promote efficient wetting of the inorganic pigment and optimal stability of the pigment in the grind resin of the pigment dispersion in the aqueous coating composition. These various functionalities will be introduced and discussed below.

The polymeric pigment dispersant is generally the reaction product of a first compound having a plurality of hydroxyl groups, a carboxylic acid anhydride, a second compound having at least one epoxy group, and an amine. The method of preparing the polymeric pigment dispersant includes the steps of reacting by polymerizing the first compound with the carboxylic anhydride to form an intermediate compound having a plurality of carboxylic acid groups, and then reacting the second compound and the amine with the carboxylic acid groups of the intermediate compound to form the polymeric pigment dispersant. The reaction step including the amine neutralizes the carboxylic acid groups of the intermediate compound. The method steps of the subject invention are preferably conducted at temperatures between 50° C. and 200° C., more preferably between 100° C. and 150° C. This method will be described in further detail below.

To prepare the polymeric pigment dispersant, the first compound is selected to maximize the number of hydroxyl groups, i.e., the hydroxyl functionality, in the first compound while establishing a foundation for the highly-branched organic structure of the polymeric pigment dispersant. The hydroxyl groups of the first compound can be primary, secondary, and tertiary hydroxyl groups. Also, the first compound is soluble in water and is present in the polymeric pigment dispersant in an amount from 1 to 20, preferably from 8 to 12, parts by weight based on 100 parts by weight of the polymeric pigment dispersant.

The first compound is more specifically selected from the group consisting of erythritol, pentaerythritol, dipentaerythritol, trimethylolethane, trimethylolpropane, dulcitol, threitol, and mixtures thereof. As understood by those skilled in the art, trimethylolethane and trimethylolpropane each provide three hydroxyl groups, erythritol and threitol each provide four hydroxyl groups, and dipentaerythritol and dulcitol each provide six hydroxyl groups. In the preferred embodiment of the subject invention, the first compound is pentaerythritol. For descriptive purposes, a chemical representation of pentaerythritol is disclosed below.

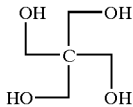

As shown above, pentaerythritol is a compound having a central carbon atom and four peripheral carbon atoms each providing a hydroxyl group for a total of four hydroxyl groups.

In view of the above characteristics of the first compound, other equivalent compounds include, but are not limited to, ethylene glycol and propylene glycol, which each provide two hydroxyl groups, and glycerol, which provides three hydroxyl groups. Other alcohols, sugars, and acids providing a plurality of hydroxyl groups are also suitable as the first compound.

The carboxylic acid anhydride that is polymerized with the first compound is selected to maximize the number of carboxylic acid groups, i.e., the acid functionality, that can be formed in the intermediate compound and also to contribute to the highly-branched organic structure of the polymeric pigment dispersant. The carboxylic acid anhydride may be either an aromatic or non-aromatic cyclic anhydride. The carboxylic acid anhydride is preferably selected from, but not limited to, the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof. In the preferred embodiment of the subject invention, the carboxylic acid anhydride is hexahydrophthalic anhydride. For descriptive purposes, a chemical representation of hexahydrophthalic anhydride is disclosed below.

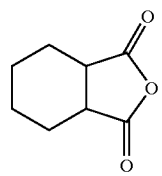

As shown above, the hexahydrophthalic anhydride provides an acid functionality whereby one carboxylic acid group can be formed into the intermediate compound per mole of the carboxylic acid anhydride introduced.

The carboxylic acid anhydride is present in the polymeric pigment dispersant in an amount from 35 to 55, preferably from 40 to 50, parts by weight based on 100 parts by weight of the polymeric pigment dispersant. Also, the molar ratio of the carboxylic acid anhydride to the first compound present in the polymeric pigment dispersant is from 2:1 to 20:1. More specifically, in the preferred embodiment, the molar ratio of the carboxylic acid anhydride, hexahydrophthalic anhydride, that is reacted with the first compound, pentaerythritol, is 4:1. That is, four moles of hexahydrophthalic anhydride are reacted with one mole of pentaerythritol to form the intermediate compound. For descriptive purposes, a chemical representation of the intermediate compound formed by the reaction of one mole pentaerythritol and four moles of hexahydrophthalic anhydride is disclosed below.

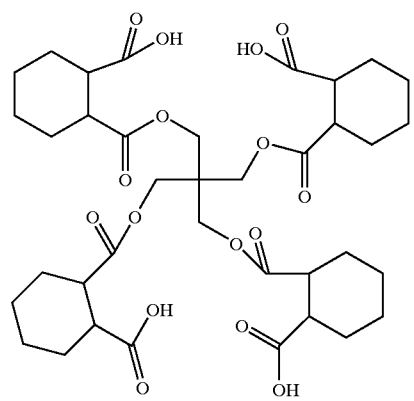

As shown above, the intermediate compound that is formed with the reactants of the preferred embodiment is a tetracarboxylic acid compound, i.e., a compound including four carboxylic acid groups or an acid functionality of four. These four carboxylic acid groups of the intermediate compound are formed when the anhydride rings of the four moles of hexahydrophthalic anhydride open forming ester linkages with the pentaerythritol, and the hydrogen atoms from the four hydroxyl groups of the pentaerythritol react with the oxygen atoms originally from the anhydride rings of the four moles of hexahydrophthalic anhydride thereby forming the tetracarboxylic acid intermediate compound according to the preferred embodiment. As stated above, the intermediate compound of the preferred embodiment has an acid functionality of four. Of course, it is to be understood that the acid functionality can decrease or increase depending upon the selection of the particular first compound and of the particular carboxylic acid anhydride, and upon the equivalent weight ratios between the first compound and the carboxylic anhydride.

The chemical representation of the intermediate compound disclosed above is merely illustrative of the subject invention. The intermediate compound disclosed above has a four-branch organic structure originally derived from the organic structure of the pentaerythritol. It is to be understood that if an alternative first compound is selected, such as dipentaerythritol which, as discussed above, provides six hydroxyl groups, then the intermediate compound would have a six-branch organic structure derived from the structure of the dipentaerythritol. Of course, six moles of hexahydrophthalic anhydride then would be selected to react with the six hydroxyl groups of the dipentaerythritol.

To prepare the polymeric pigment dispersant of the subject invention, the second compound is reacted with at least one of the carboxylic acid groups of the intermediate compound. More specifically, it is the epoxy group of the second compound that reacts with one of the carboxylic acid groups of the intermediate compound. The second compound is selected to include at least one epoxy group, and is present in the polymeric pigment dispersant in an amount from 10 to 30, preferably from 15 to 25, parts by weight based on 100 parts by weight of the polymeric pigment dispersant. The second compound is further selected to include from 6 to 20, preferably from 10 to 15, carbon atoms such that the miscibility between the polymeric pigment dispersant, including the second compound, and a binder resin of the aqueous coating composition is maximized. As such, the second compound is selected from the group consisting of glycidylneodecanoate, dodecyl oxide, tetradecyl oxide, octadecyl oxide, and cyclohexene oxide, and mixtures thereof. In view of the above characteristics of the second compound, other equivalent compounds include, but are not limited to, epoxy-containing aromatic hydrocarbons such as bisphenol A monoglycidyl ether.

In the preferred embodiment of the subject invention, the second compound is glycidylneodecanoate. As is known in the art, glycidylneodecanoate is commercially available from Miller-Stephenson Chemical Company, Inc. under its CARDURA® product line, as CARDURA E 10S. For descriptive purposes, a chemical representation of glycidylneodecanoate is disclosed below.

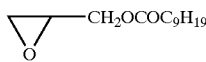

As shown above, glycidylneodecanoate includes one epoxy group. In the preferred embodiment, one mole of glycidylneodecanoate is reacted with one of the four carboxylic acid groups of the intermediate compound. More specifically, the epoxy ring of the glycidylneodecanoate opens such that one of the two carbon atoms, originally in the epoxy ring of the glycidylneodecanoate, reacts and bonds with an oxygen atom from one of the hydroxyls of the carboxylic acid groups of the intermediate compound. It is to be understood that in the reaction, the epoxy ring can open in one of two manners such that either one of the carbon atoms of the epoxy ring reacts and bonds with the oxygen atom from the hydroxyl of the carboxylic acid group. In one manner, the completed dispersant includes a primary hydroxyl, and in a second manner, the completed dispersant includes a secondary hydroxyl. The two manners of epoxy ring opening are represented below in the alternative forms of the completed polymeric pigment dispersant.

Next, the amine is reacted with the rest of the carboxylic acid groups of the intermediate compound. This reaction step is a neutralization reaction. It is the nitrogen atom of the amine that reacts with the other of the carboxylic acid groups of the intermediate compound. Specifically, the nitrogen atom of the amine reacts with the hydrogen atoms from the carboxylic acid groups of the intermediate compound. The amine is selected to be miscible in water and is selected from the group consisting of dimethylethanolamine and amino methyl propanol, and mixtures thereof. In view of the above characteristics of the amine, other equivalent compounds include, but are not limited to, NH$_3$, alkanolamines, primary, secondary, and tertiary alkyl amines such as ethylamine, diethylamine, and triethylamine, respectively, and even aryl amines such as aniline. In the preferred embodiment of the subject invention, the amine is an alkanolamine, dimethylethanolamine. For descriptive purposes, a chemical representation of dimethylethanolamine is disclosed below.

The amine is present in the polymeric pigment dispersant in an amount from 10 to 35, preferably from 15 to 25, parts by weight based on 100 parts by weight of the polymeric pigment dispersant. Also, the molar ratio of the amine to the second compound present in the polymeric pigment dispersant is from 1:1 to 20:1. More specifically, in the preferred embodiment, the molar ratio of the amine, dimethylethanolamine, to the second compound, glycidylneodecanoate, is 3:1.

In terms of the preferred embodiment, three moles of dimethylethanolamine react with the remaining three of four carboxylic acid groups of the intermediate compound to form the polymeric pigment dispersant. That is, the dimethylethanolamine reacts with the hydroxyls of the three carboxylic acid groups that did not previously react with the glycidylneodecanoate. More specifically, this reaction step is a neutralization step whereby the nitrogen atoms from the three moles of dimethylethanolamine neutralize these three carboxylic acid groups of the intermediate compound to form the preferred polymeric pigment dispersant having three carboxylate anions. A chemical representation of the completed polymeric pigment dispersant of the preferred embodiment is disclosed below.

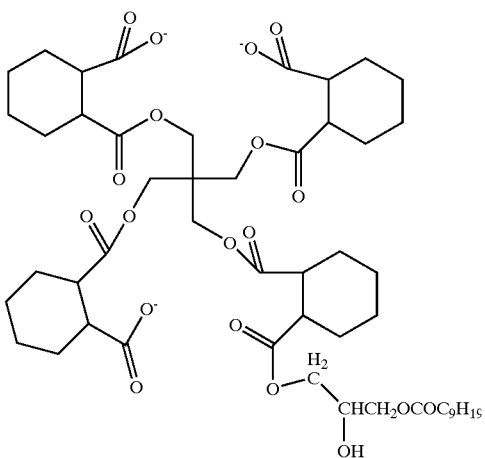

As shown above, the polymeric pigment dispersant includes a secondary hydroxyl that results from the particular manner of epoxy ring opening of the glycidylneodecanoate. However, as discussed previously, the polymeric pigment dispersant can also result in a primary hydroxyl that results from a second manner of epoxy ring opening. A chemical representation of the alternative form of the polymeric pigment dispersant having a primary hydroxyl is disclosed below.

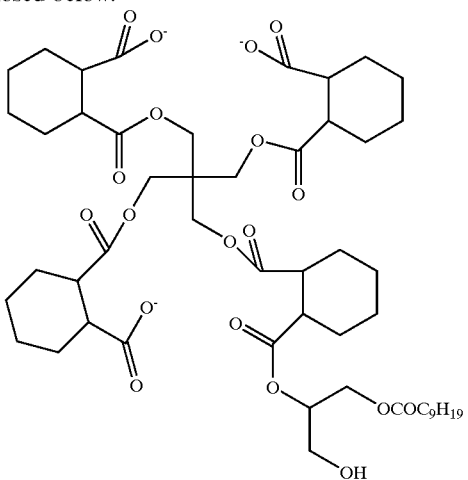

As shown above in either of the alternative embodiments, the polymeric pigment dispersant is a polyester carboxylate having a two-dimensional, four-branch organic structure. The alternative embodiments of the polymeric pigment dispersant can be generically represented as indicated below.

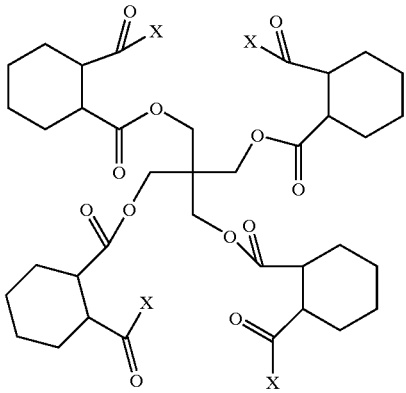

In this representation of the polymeric pigment dispersant according to the subject invention, X is selected from the group consisting of (i) $O^-$, and (ii) $R_1$ wherein $R_1$ is a compound having at least one oxygen atom and from 6 to 20 carbon atoms. In the preferred embodiment where the completed polymeric pigment dispersant is in part derived from glycidylneodecanoate, $R_1$ is either

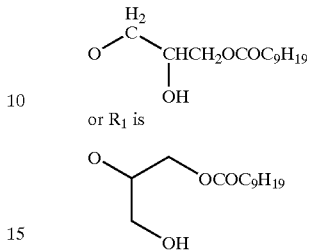

or $R_1$ is

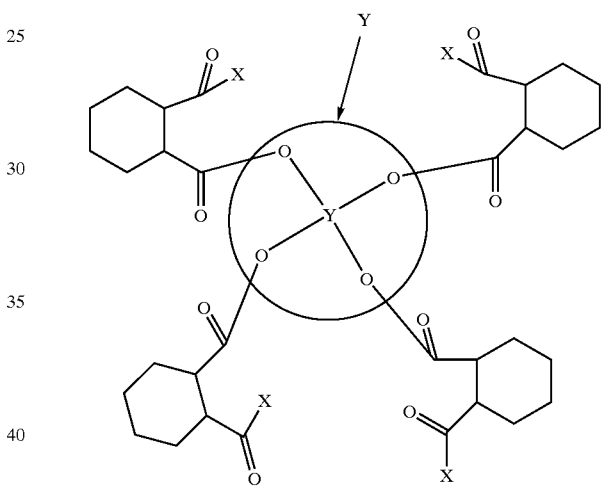

The structural chemical representations disclosed above include a four-branch organic structure dependent on the first compound, pentaerythritol. However, the polymeric pigment dispersant of the preferred embodiment need not be limited to pentaerythritol. Instead, the polymeric dispersant can be more generically represented as indicated below.

In this representation, Y is not limited to pentaerythritol. Instead, Y can be selected from the group consisting of $C_2$ to $C_{20}$ hydrocarbons having four hydroxyl groups. X is selected as above. That is, X is selected from the group consisting of (i) $O^-$, and (ii)$R_1$, wherein $R_1$ is a compound having at least one oxygen atom and from 6 to 20 carbon atoms.

The polymeric pigment dispersant has a weight-average molecular weight, $M_w$, of 3000 or less. Preferably, the molecular weight is from 500 to 2000, and more preferably, from 900 to 1200. Additionally, the polymeric pigment dispersant of the subject invention has a non-volatile content of from 45 to 65, preferably from 50 to 60, percent non-volatile by weight. Pigment dispersions utilizing this polymeric pigment dispersant have pigment-to-binder ratios 15, most likely from 15 to 30, with pigment particles having a particle size of less than six microns. That is, the grind resin of the subject invention is robust enough to permit the inorganic pigments dispersed within to be ground or milled long enough to achieve pigment particle sizes of less than six microns without degradation and coagulation of the grind resin. Furthermore, pigment dispersions utilizing this polymeric pigment dispersant have viscosities of less than 80 Krebs units. The viscosities of these pigment dispersions were measured after thirty minutes of mixing with a Cowles blade at approximately 3000 RPM and at 105.2° F.

The resulting structure of the completed polymeric pigment dispersant of the subject invention essentially 'anchors' the inorganic pigment in the pigment dispersion thereby maintaining the pigment uniformly dispersed throughout the grind resin. More specifically, the acid functionality of the completed polymeric pigment dispersant physically interacts with the metal centers inherent in inorganic pigments by complex or coordinated covalent bonding. This physical interaction keeps the pigment uniformly dispersed throughout the grind resin. Also, as discussed above, the hydrocarbon chain on the completed polymeric pigment dispersant that is derived from the glycidylneodecanoate, which contains from 6 to 20 carbon atoms, promotes thorough miscibility between the polymeric pigment dispersant and the binder resin of the aqueous coating composition.

Of course, in terms of the preferred embodiment, after the three moles of dimethylethanolamine neutralize the remaining carboxylic acid groups of the intermediate compound to form the polymeric pigment dispersant, three moles of a dimethylethanolamine cation remain in the reaction. For descriptive purposes, a chemical representation of this remaining dimethylethanolamine cation is disclosed below.

It is to be understood that all of the preceding chemical representations are merely two-dimensional chemical representations and that the structure of these chemical representations may be other than as indicated.

The following examples illustrating the formation of and the use of the polymeric pigment dispersant of the subject invention, as presented herein, are intended to illustrate and not limit the invention.

EXAMPLES

Example 1

The polyester carboxylate polymeric pigment dispersant was prepared by adding and reacting the following parts, by weight, unless otherwise indicated.

TABLE 1

| Reactant | Amount (moles) | Amount (grams) | Other |
|---|---|---|---|
| Pentaerythritol [PE] | 0.5 | 68.0 | — |

TABLE 1-continued

| Reactant | Amount (moles) | Amount (grams) | Other |
|---|---|---|---|
| Hexahydrophthalic anhydride [HHPA] | 2.0 | 308.0 | — |
| Glycidylneodecanoate [CARDURA E 10S] | 0.5 | 119.6 | — |
| Dimethylethanolamine [DMEA] | 1.5 | 267.0 | 267.0 grams of a 50% soln. of DMEA 133.5 grams of DMEA and 133.5 grams of $H_2O$ |

Per the above table, Table 1, 308.0 grams of HHPA were added in a reaction flask to 65.0 grams of PE. The reaction flask, including the PE and HHPA, was heated via a conventional heat supply to a temperature of 120° C. to 125° C., when an exotherm was observed, peaking at approximately 150° to 160° C. After this exotherm, the batch was allowed to cool and was maintained at 130° C. for approximately two hours. Standard titration for acid number revealed that the reaction to form the intermediate compound was complete. Next, 119.6 grams of CARDURA E 10S were added to the intermediate compounds. Once again, the heat supply was activated to heat the temperature of the reaction flask to 120° C. The temperature of the reaction flask increased from between 160° C. to 190° C. within 30 minutes indicating another exotherm, and then the temperature of the reaction flask decreased to 125° C.

Next, the reaction product of the intermediate compound having the reacted CARDURA E 10S was titrated to determine the weight per epoxy (WPE) as an indication of the completeness of the reaction. Alternatively, the acid number of the reaction product could be determined. The WPE and the acid number are methods for indicating the completeness of a reaction that are known in the art.

Once it was determined that the reaction between the intermediate compound and the CARDURA E 10S was complete, the reaction product of the intermediate compound and the reacted CARDURA E 10S was then neutralized with 267.0 grams of a 50% by weight solution of DMEA in $H_2O$ to form the completed polyester carboxylate polymeric pigment dispersant.

Example 2

The completed polyester carboxylate polymeric pigment dispersant was then incorporated into a modified pigment dispersion according to the following table, Table 2.

TABLE 2

| Pigment Dispersion Component (modified) | Amount (grams) | Other |
|---|---|---|
| POLYESTER CARBOXYLATE POLYMERIC PIGMENT DISPERSANT | 3.72 | — |
| water [de-ionized water] | 11.40 | — |
| co-solvent [propyl propasol] | 0.72 | — |
| pigment [titanium dioxide, $TiO_2$] | 41.40 | Added pigment gradually over time and under stirring |
| Appearance Evaluation | N/A | Glossy appearance of modified pigment dispersion on a 2 mil thickness drawdown |

TABLE 2-continued

| Pigment Dispersion Component (modified) | Amount (grams) | Other |
|---|---|---|
| Stability | Type - shelf RT (room temp.) × 3 months | Acceptable |
| Stability | Type - heat 140° F. × 2 weeks | Acceptable |

Per the above table, Table 2, 3.72 grams of the polyester carboxylate polymeric pigment dispersant and 11.40 grams of de-ionized water and 0.72 grams of propyl propasol were added together to prepare a modified pigment dispersion for an aqueous coating composition. Next, 41.40 grams of $TiO_2$ pigment were added gradually over time and under stirring to the polyester carboxylate polymeric pigment dispersant/the de-ionized water/propyl propasol blend. After the addition of the TiO2 pigment to the blend, the appearance of the modified pigment dispersion was evaluated by a 2 mil thickness drawdown. The evaluation of the modified pigment dispersion utilizing the polyester carboxylate polymeric pigment dispersant of the subject invention concluded a glossy appearance. The stability of this modified pigment dispersion was also evaluated. The conditions for both the standard shelf stability and for the standard heat stability are detailed above in Table 2. The results for both the standard shelf stability and the standard heat stability were acceptable.

Example 3

The completed polyester carboxylate polymeric pigment dispersant was also incorporated into a 'scaled-up' pigment dispersion according to the following table, Table 3.

TABLE 3

| Pigment Dispersion Component (scale-up) | Amount (grams) | Other |
|---|---|---|
| POLYESTER CARBOXYLATE POLYMERIC PIGMENT DISPERSANT | 186.0 | — |
| Water [de-ionized water] | 708.0 (570.0 + 138.0) | — |
| co-solvent [propyl propasol] | 36.0 | — |
| pigment [titanium dioxide, $TiO_2$] | 2070.0 | Added pigment gradually over time and under stirring |
| Appearance Evaluation | N/A | Glossy appearance of scaled-up pigment dispersion on a 2 mil thickness drawdown |
| Particle Size Evaluation | N/A | No pigment particles were observed utilizing standard grind gauge method (thus indicating a pigment particle size of less than 6 microns) |
| Stability | Type - shelf RT (room temp.) × 3 months | Acceptable |
| Stability | Type - heat 140° F. × 2 weeks | Acceptable |

Per the above table, Table 3, 186.0 grams of the polyester carboxylate polymeric pigment dispersant and 570.0 grams of de-ionized water and 36.0 grams of propyl propasol were added together to prepare a scaled-up pigment dispersion for an aqueous coating composition. Next, 2070.0 grams of $TiO_2$ pigment were added gradually over time and under stirring to the polyester carboxylate polymeric pigment dispersant/the de-ionized water/propyl propasol blend. An additional 138.0 grams of de-ionized water were added to the blend having the $TiO_2$ pigment. The scaled-up pigment dispersion was then dispersed with a Cowles blade at 3000 RPM. After this, the appearance of the scaled-up pigment dispersion was evaluated by a 2 mil thickness drawdown. The evaluation of the scaled-up pigment dispersion utilizing the polyester carboxylate polymeric pigment dispersant of the subject invention concluded a glossy appearance. Additionally, the particle size of the scaled-up pigment dispersion was determined utilizing a standard grind gauge method. No pigment particles were observed which indicates that the pigment particle size is less than 6 microns. The stability of this scaled-up pigment dispersion was also evaluated. As shown in Table 3, for both standard shelf stability and standard heat stability, the stability results of the scaled-up pigment dispersion were acceptable.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:
1. A pigment dispersion comprising inorganic pigment and a polymeric pigment dispersant comprising the reaction product of:
   a first compound having a plurality of hydroxyl groups;
   a carboxylic acid anhydride;

a second compound having at least one epoxy group selected from the group consisting of glycidylneodecanoate, dodecyl oxide, tetradecyl oxide, octadecyl oxide, and cyclohexene oxide, bisphenol A monoglycidyl ether and mixtures thereof; and an amine.

2. A pigment dispersion as set forth in claim 1 wherein said first compound is selected from the group consisting of erythritol, pentaerythritol, dipentaerythritol, trimethylolethane, trimethylolpropene, dulcitol, threitol, and mixtures thereof.

3. A pigment dispersion as set forth in claim 1 wherein said carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

4. A pigment dispersion as set forth in claim 1 wherein said second compound has from 6 to 20 carbon atoms.

5. A pigment dispersion as set forth in claim 1 wherein said amine is selected from the group consisting of dimethylethanolamine and amino methyl propanol, and mixtures thereof.

6. A pigment dispersion as set forth in claim 1 wherein said polymeric pigment dispersant has a molecular weight of 3000 or less.

7. A pigment dispersion as set forth in claim 1 wherein said polymeric pigment dispersant has a non-volatile content of from 45 to 65 percent non-volatile by weight.

8. A polymeric pigment dispersant for efficient wetting and grinding of a pigment, said polymeric pigment dispersant comprising the reaction product of:

a first compound having a plurality of hydroxyl groups;

a carboxylic acid anhydride;

a second compound having at least one epoxy group selected from the group consisting of glycidylneodecanoate, dodecyl oxide, tetredecyl oxide, octadecyl oxide, and cyclohexene oxide, bisphenol A monoglycidyl ether and mixtures thereof; and an amine.

9. A polymeric pigment dispersant as set forth in claim 8 wherein said first compound is selected from the group consisting of erythritol, pentaerythritol, dipentaerythritol, trimethylolethane, trimethylolpropane, dulcitol, threitol, and mixtures thereof.

10. A polymeric pigment dispersant as set forth in claim 8 wherein the molar ratio of said carboxylic acid anhydride to said first compound is from 2:1 to 20:1.

11. A polymeric pigment dispersant as set forth in claim 8 wherein said first compound is present in an amount from 1 to 20 parts by weight based on 100 parts by weight of the polymeric pigment dispersant.

12. A polymeric pigment dispersant as set forth in claim 9 wherein said carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

13. A polymeric pigment dispersant as set forth in claim 8 wherein said carboxylic acid anhydride is present in an amount from 35 to 55 parts by weight based on 100 parts by weight of the polymeric pigment dispersant.

14. A polymeric pigment dispersant as set forth in claim 8 wherein said second compound has from 6 to 20 carbon atoms.

15. A polymeric pigment dispersant as set forth in claim 8 wherein said second compound is present in an amount from 10 to 30 parts by weight based on 100 parts by weight of the polymeric pigment dispersant.

16. A polymeric pigment dispersant as set forth in claim 8 wherein said amine is selected from the group consisting of dimethylethanolamine and amino methyl propanol, and mixtures thereof.

17. A polymeric pigment dispersant as set forth in claim 8 wherein the molar ratio of said amine to said second compound is from 1:1 to 20:1.

18. A polymeric pigment dispersant as set forth in claim 8 wherein said amine is present in amount from 10 to 35 parts by weight based on 100 parts by weight of the polymeric pigment dispersant.

19. A polymeric pigment dispersant as set forth in claim 8 having a molecular weight of 3000 or less.

20. A polymeric pigment dispersant as set forth in claim 8 having a non-volatile content of from 45 to 65 percent non-volatile by weight.

21. A method of preparing a polymeric pigment dispersant for efficient wetting and grinding of a pigment, said method comprising the steps of:

(i) reacting a first compound having a plurality of hydroxyl groups with a carboxylic acid anhydride to form an intermediate compound having a plurality of carboxylic acid groups;

(ii) reacting at least one of the carboxylic acid groups of the intermediate compound with a second compound having at least one epoxy group glycidyineodecanoate, dodecyl oxide, tetradecyl oxide, octadecyl oxide, and cyclohexene oxide, bisphenol A monoglycidyl ether and mixtures thereof; and (iii) reacting the other of the carboxylic acid groups of the intermediate compound with an amine.

22. A method as set forth in claim 21 wherein the steps of (i) reacting the first compound with the carboxylic acid anhydride, (ii) reacting at least one of the carboxylic acid groups of the intermediate compound with the second compound, and (iii) reacting the other of the carboxylic acid groups of the intermediate compound with the amine are conducted at a temperature between 50° C. and 200° C.

23. A method as set forth in claim 21 wherein the first compound is selected from the group consisting of erythritol, pentaerythritol, dipentaerythritol, trimethylolethane, trimethylolpropane, dulcitol, threitol, and mixtures thereof.

24. A method as set forth in claim 21 wherein the first compound is pentaerythritol.

25. A method as set forth in claim 21 wherein the carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

26. A method as set forth in claim 24 wherein the carboxylic acid anhydride is hexahydrophthalic anhydride.

27. A method as set forth in claim 26 wherein the second compound is glycidylneodecanoate.

28. A method as set forth in claim 21 wherein the amine is selected from the group consisting of dimethylethanolamine and amino methyl propanol, and mixtures thereof.

29. A method as set forth in claim 27 wherein the amine is dimethylethanolamine.

30. A method as set forth in claim 29 wherein the step of reacting the first compound with the carboxylic acid anhydride is further defined as reacting one mole of pentaerythritol with four moles of hexahydrophthalic anhydride to form the intermediate compound having four carboxylic acid groups.

31. A method as set forth in claim 30 wherein the step of reacting at least one of the carboxylic acid groups of the intermediate compound with the second compound is further defined as reacting one of the four carboxylic acid groups of the intermediate compound with one mole of glycidylneodecanoate.

32. A method as set forth in claim 31 wherein the step of reacting the other of the carboxylic acid groups of the intermediate compound with the amine is further defined as reacting the remaining three of the four carboxylic acid groups of the intermediate compound with three moles of dimethylethanolamine.

33. A polymeric pigment dispersant for efficient wetting and grinding of a pigment, said polymeric pigment dispersant being of the general formula:

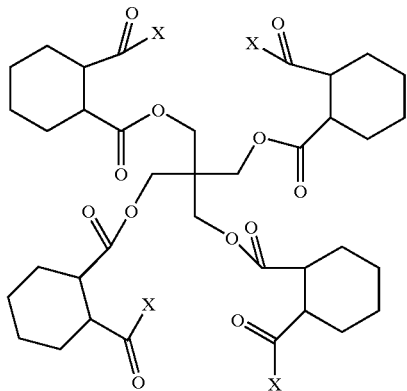

wherein X is selected from the group consisting of;
(i) O$^-$; and
(ii) R$_1$;
wherein R$_1$ is a compound having at least one oxygen atom and from 6 to 20 carbon atoms.

34. A polymeric pigment dispersant as set forth in claim 33 wherein R$_1$ is further defined as

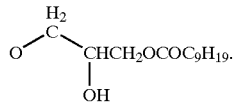

35. A polymeric pigment dispersant as set forth in claim 33 wherein R$_1$ is further defined as

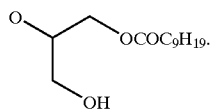

36. A polymeric pigment dispersant for efficient wetting and grinding of a pigment, said polymeric pigment dispersant being of the general formula:

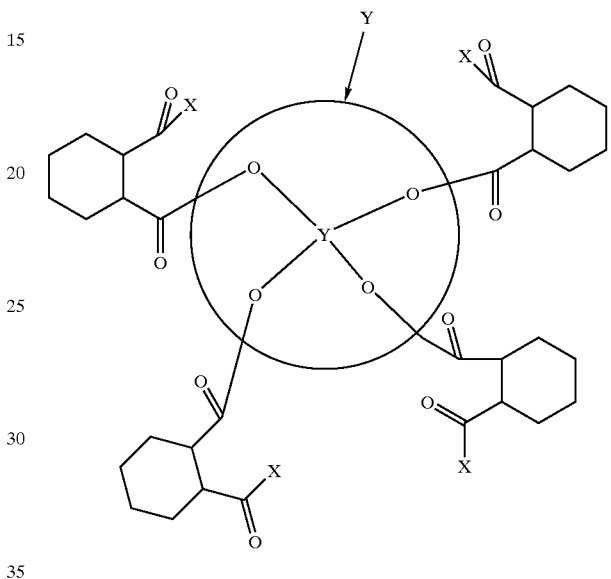

wherein;

Y is selected from the group consisting of C$_2$ to C$_{20}$ compounds having four hydroxyl groups; and X is selected from the group consisting of;
(i) O$^-$; and
(ii) R$_1$;
wherein R$_1$ is a compound having at least one oxygen atom and from 6 to 20 carbon atoms.

* * * * *